United States Patent
Kim et al.

(10) Patent No.: US 6,360,226 B1
(45) Date of Patent: Mar. 19, 2002

(54) METHOD OF LOADING OBJECTS USING SPANNING TREE

(75) Inventors: Wan Seok Kim; Mi Young Lee; Dae Young Her, all of Daejon (KR)

(73) Assignee: Electronics and Telecommunications Research Institute, Daejon (KR)

(*) Notice: Subject to any disclaimer, the term of this patent is extended or adjusted under 35 U.S.C. 154(b) by 0 days.

(21) Appl. No.: 09/137,538

(22) Filed: Aug. 21, 1998

(30) Foreign Application Priority Data

Dec. 22, 1997 (KR) .......................................... 97-72054

(51) Int. Cl.$^7$ ................................................. G06F 17/30
(52) U.S. Cl. ................................. 707/102; 707/103 R
(58) Field of Search ........................... 707/2, 100, 101, 707/102, 104, 103 R

(56) References Cited

U.S. PATENT DOCUMENTS

| | | | | |
|---|---|---|---|---|
| 5,560,005 A | * | 9/1996 | Hoover et al. ................. | 707/10 |
| 5,627,979 A | * | 5/1997 | Chang et al. .................. | 707/2 |
| 6,105,018 A | * | 8/2000 | Demers et al. ................. | 707/2 |

OTHER PUBLICATIONS

Ismailcem Budak Arpinar, Asuman Dogac and Cem Evrendilek; MoodView: An Advanced Graphical User Interface for OODBMSs; Dec. 1993; pp. 11–18.

O. Deux, et al.; The story of $O_2$; Mar. 1990; pp. 91–108.

UniSQL/X™; Database Management System User's Manual, Jan. 1995; pp. 16–2 to 16–12.

* cited by examiner

Primary Examiner—Thomas Black
(74) Attorney, Agent, or Firm—Antonelli, Terry, Stout & Kraus, LLP

(57) ABSTRACT

The present invention relates to a method of loading objects using a spanning tree. The present invention provides a method of loading objects using a spanning tree, which analyzes the inter-object reference relation to generate a spanning tree and thereby analyzes the inter-object reference relation through a set of nodes and routes without sequentially determining the object-referenced value, and then subsequently which decides the sequence of the objects and generates a referenced value, and which decides the sequence of the related objects and generates a referenced value after cutting off a circulation in case of existing between objects.

10 Claims, 4 Drawing Sheets

METHOD OF LOADING OBJECTS USING SPANNING TREE

BACKGROUND OF THE INVENTION

1. Field of the Invention

The present invention relates to a method of loading objects using a spanning tree that can enhance the system efficiency. More particularly, the inter-object reference relation is analyzed as a set to generate a spanning tree which enables objects to be loaded at a time.

2. Description of the Prior Art

In an object-oriented database, there can be such cases that an object is loaded into or unloaded from the database sequentially, or that the inter-object reference relation can exist or can have a circulation. In loading or unloading objects, the conventional object-oriented database management systems provided the user the method of loading or unloading the whole database without solving how to load or unload only the object of partial class that he or she wanted.

That is, so as to load certain objects in the database management system, the conventional object loading method determines the object value to each class with removing the object-referenced value and then subsequently assigns the object-referenced value, which incurs repeating the same manipulation more than two times for loading and thus lowers the system efficiency.

SUMMARY OF THE INVENTION

Therefore, it is an object of the present invention to provide a method of loading objects using a spanning tree generated by analyzing the inter-object reference relation as a set, which analyzes the inter-object reference relation through a set of nodes and routes without sequentially determining the object-referenced value, and then subsequently which decides the sequence of the objects and generates a referenced value, and which decides the sequence of the related objects and generates a referenced value after cutting off a circulation in case that it exits between objects.

It is another object of the present invention to provide a method of loading objects using a spanning tree comprises the steps of: collecting the class information about the object loading in the script file for loading an object; composing the class-referenced relation into the graph using the class information; analyzing a set of the class resulting from the inter-class reference in the graph and decomposing the set of the class into the most accessible element; searching the graph of the most accessible element and generating a spanning tree having the tree edge, the backward edge, the forward edge and the cross edge; storing the object connected to each node with searching the spanning tree; filling with inputs the other object fields than the referenced field in the case of the existence of the backward edge in the node, and temporarily allocating the null value to the excluded field, and withdrawing loading objects if the skima of the loaded object does not allow the null value in the referenced field; entering the object and storing the entered object in the reference list since there is no inter-class reference relation in the input file, if there is the leaf node without backward edge in the node; entering the referenced value not yet determined by searching each node of the graph in which backward edge is found.

BRIEF DESCRIPTION OF DRAWINGS

For fuller understanding of the nature and object of the invention, reference should be had to the following detailed description taken in conjunction with the accompanying drawings in which.

Similar reference characters refer to similar parts in the several views of the drawings.

DESCRIPTION OF THE PREFERRED EMBODIMENT

The present invention is to be explained specifically hereinafter with reference to the attached drawings.

Figure 1:
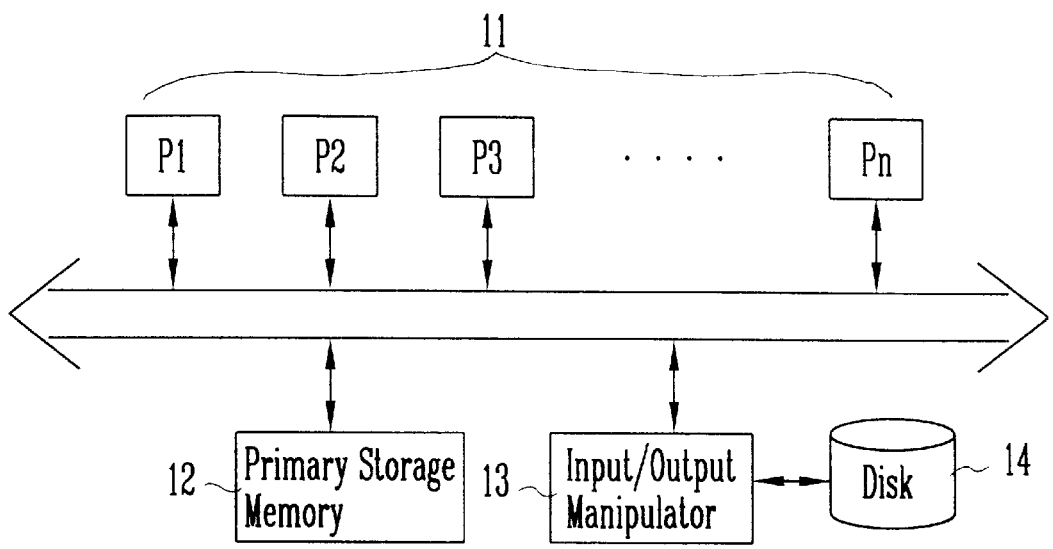
FIG. 1 is a block diagram of a hardware applied to the present invention.

The invention is practiced in the hardware such as illustrated in FIG. 1, where the hardware includes a plurality of processor (P1 to Pn) 11, a primary storage memory 12, an input/output manipulator 13 and a disk 14, a secondary storage memory. Like this way, the invention can be operated in the general hardware's circumstance which is composed of a single processor or multiple processors.

Figure 2:
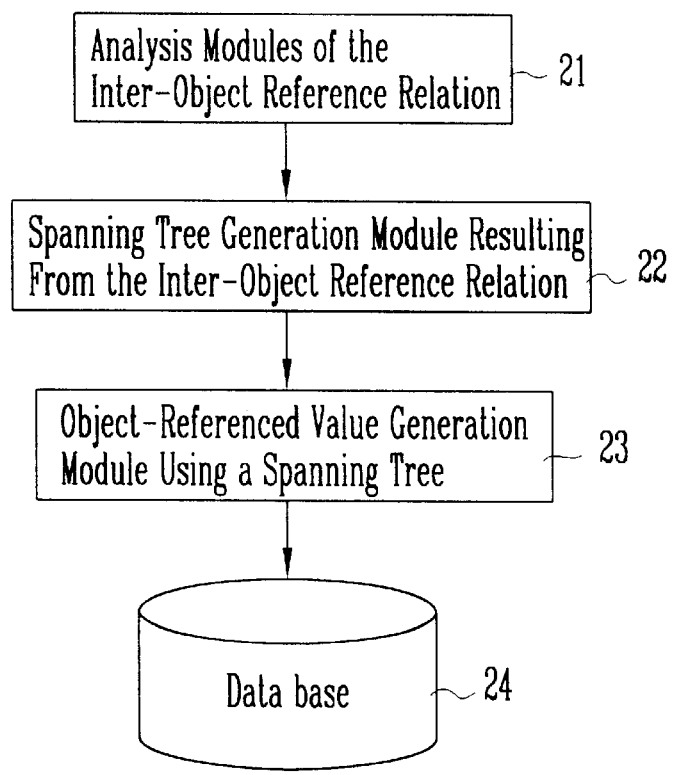
FIG. 2 is a block diagram of modules in the object loading system using a spanning tree.

FIG. 2 is a schematic diagram of the object loading system module using a spanning tree in the present invention.

As illustrated, the invention's manipulating system basically consists of analysis modules of the inter-object reference relation 21, the spanning tree generation module resulting from the analysis of the inter-object reference relation 22, the object-referenced value generation module using the spanning tree 23 and the database stored in a disk according to the reference relation 24.

Figure 3:
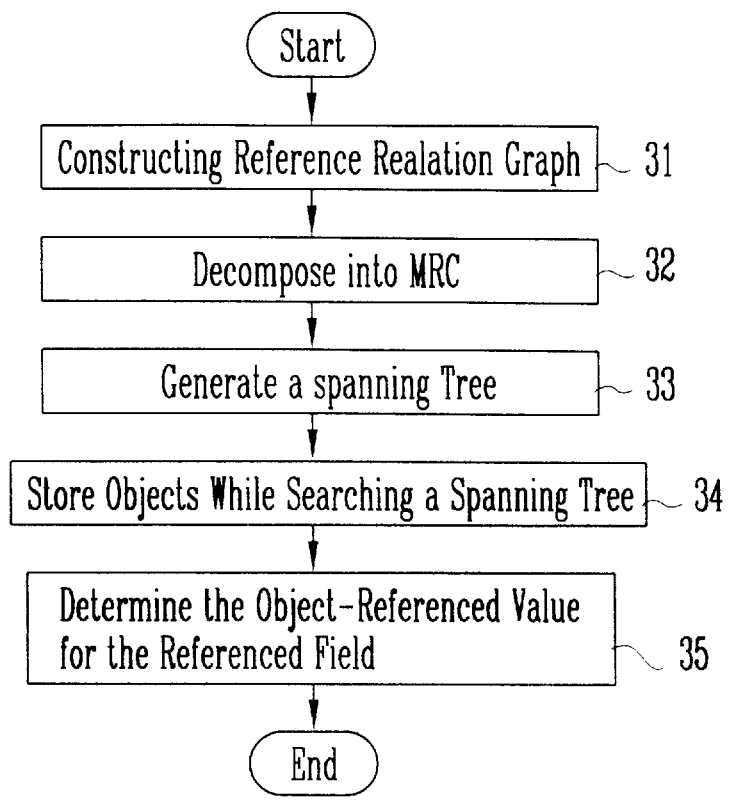
FIG. 3 is a flow diagram schematically illustrating the method of loading objects using a spanning tree according to the present invention.

FIG. 3 is a flow diagram illustrating a method of loading objects using a spanning tree according to the present invention.

Above all, the class-referenced relation is constructed by the graph (G) after collecting class information related to an object loading in a script file 31. And, in the graph (G), the class set is analyzed in accordance with the reference between the class and is decomposed into Maximal Reachable Component (hereinafter, referred to as a MRC) 32. MRC means to have the largest number of nodes in R(v) which includes R(w) of a node w. A reachable set is defined as a set of accessible nodes when searching along the link from the given nodes and is expressed as follows;

$$R(v)=\{w|\text{there is a path from } v \text{ to } w\}$$

$$R(\{v_1, v_2, \ldots v_n\})=R(v_1)UR(v_2)U \ldots UR(v_n)$$

Also, a touchable set is defined as a set of nodes accessible along the link from the given nodes and is expressed as follows;

$$T(v)=\{w|\text{there is a path from } w \text{ to } v\}$$

$$T(\{v_1, v_2, \ldots v_n\})=T(v_1)UT(v_2)U \ldots UT(v_n)$$

In a graph, there can be several MRCs, and nodes x, y exist in the same MRC if they satisfy the following condition;

$$R(x)UR(T(x))=R(y)UR(T(y))$$

The following shows an algorithm that decomposes the inter-class reference graph into MRCs;
N //the union of total nodes in the reference relation graph
R(r) //the set of nodes accessed from node r
v //spanning tree root
A{ };
k=0;
While (A≠N){
   $A_k$=R(r);
   for (each v⊆N){
     if ($A_k$⊂R(v)) {
     $A_k$=R(v);
     }
   }
   A=A∪ $A_k$;
   K++;
}

From the above algorithm, it is possible to acquire the inter-class reference relation graph which is designated at loading objects. In other words, by searching along the link from the given nodes, the algorithm finds several reached sets, of which sets the algorithm only seeks the unions existing independently more than one. The routes of each set are found to generate the spanning tree. The spanning tree is transformed to the one which has a route of v node corresponding to $A_k$=R(v) of each set, and the referenced object is firstly loaded. After that, POID of the object is obtained and the referenced object is loaded. The algorithm represented above can also be applied to the case of circulation existing in the reference relation.

Further, using a deep priority search from the decomposed MRC graph ($G_i$) generates the spanning tree. Here, the tree edge, the backward edge, the forward edge and the cross edge are generated 33. While searching each spanning tree with postorder, the contents of the file connected to each node are stored into the class instance 34. In this regard, it should be noted that the visiting sequence of the child of each node has to be equal to the one in generating the spanning tree. The existence of the backward edge in nodes means that there is a circulation in the referencing relation, and the other object fields are to be filled with input excluding the referenced field which creates a circulation. The excluded field is to be temporary allocated with null value. If the schema of the object does not allow the null value in the referenced field, loading an object should be withdrawn. The node should be recorded if it is found to have the backward edge, namely, a circulation. The leaf node without any backward edge has no inter-class referential relation specified in the input file, and therefore inputs an object as it is. The entered object is then stored in the referential list. The internal node without any backward edge is in the condition of entering all the objects of its child, and therefore the referenced field can be known by searching the referential list. Once visited, the node is not to be visited any longer.

Hereinafter, a referenced value not yet determined is entered into the node that was found to have backward edge in the graph G 35. From the fact that the objects of the class to referential is set to be entered, the object-referenced value can be solved and the nodes of the graph G do not need to be searched sequentially.

Figure 4:
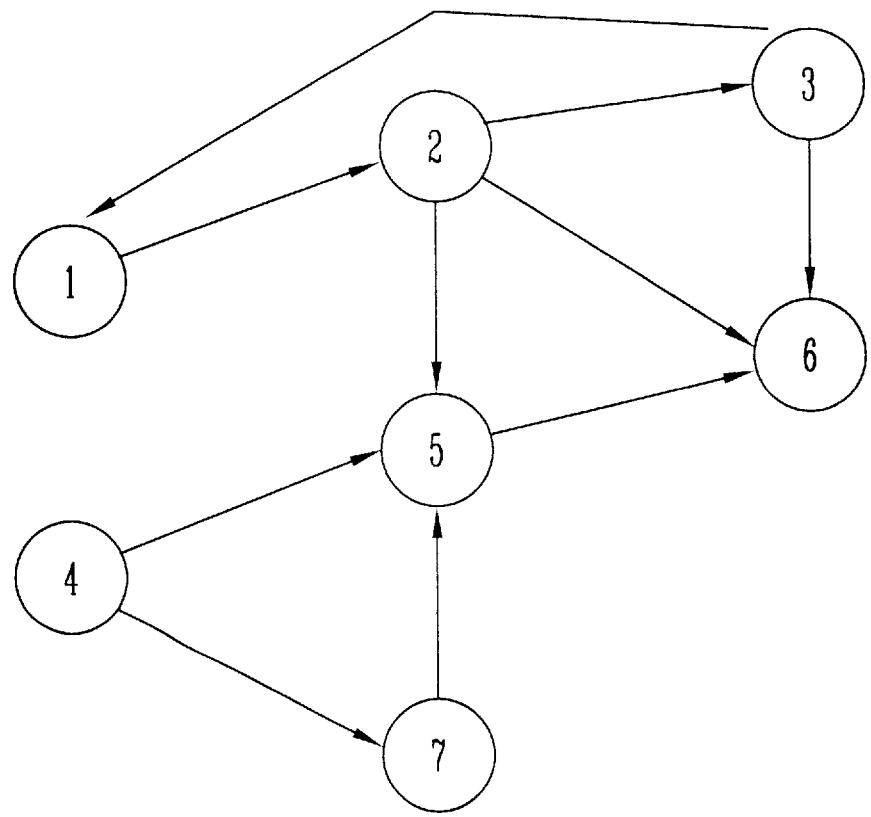
FIG. 4 is a diagram representing an example of the class-referenced graph according to the present invention.

FIG. 4 is a diagram representing an example of the class-referenced graph according to the present invention, which loads objects in the classes 1, 2, 3, 4, 5, 6, 7 and shows the referential relation.

Figure 5:
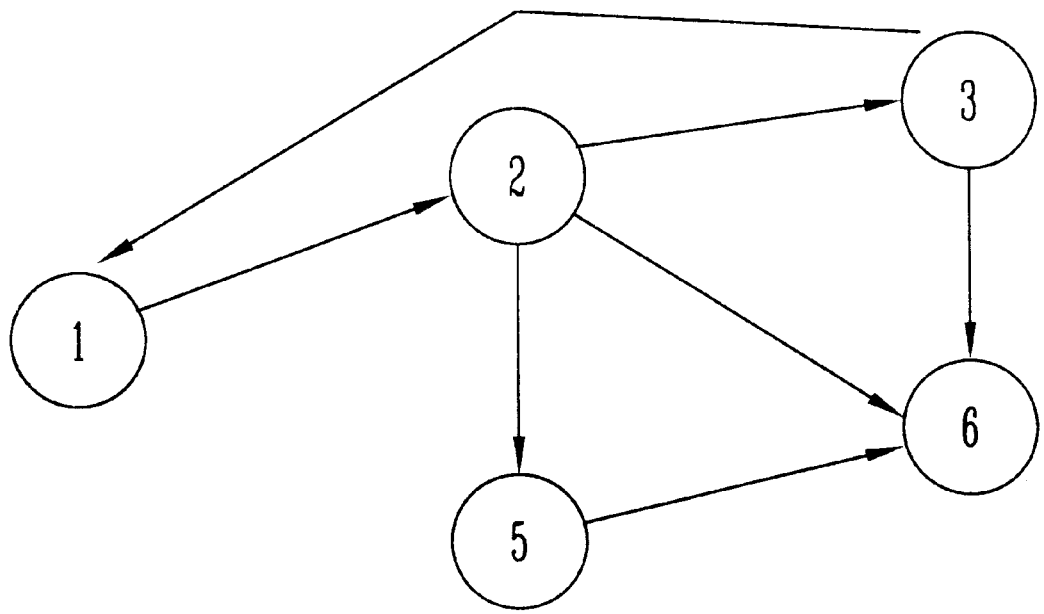
FIG. 5 is a diagram representing an example of the graph decomposing MRC from the class-referenced graph according to the present invention.
Figure 5:
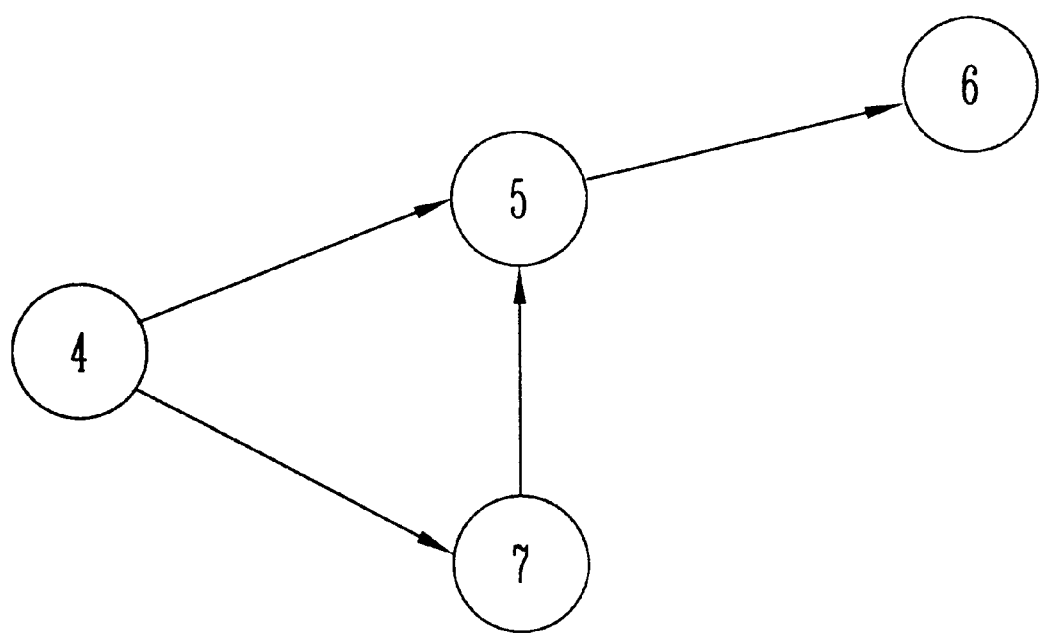

FIG. 5 is a diagram representing an example of the graph decomposing MRC from the class-referenced graph according to the present invention.

Figure 6:
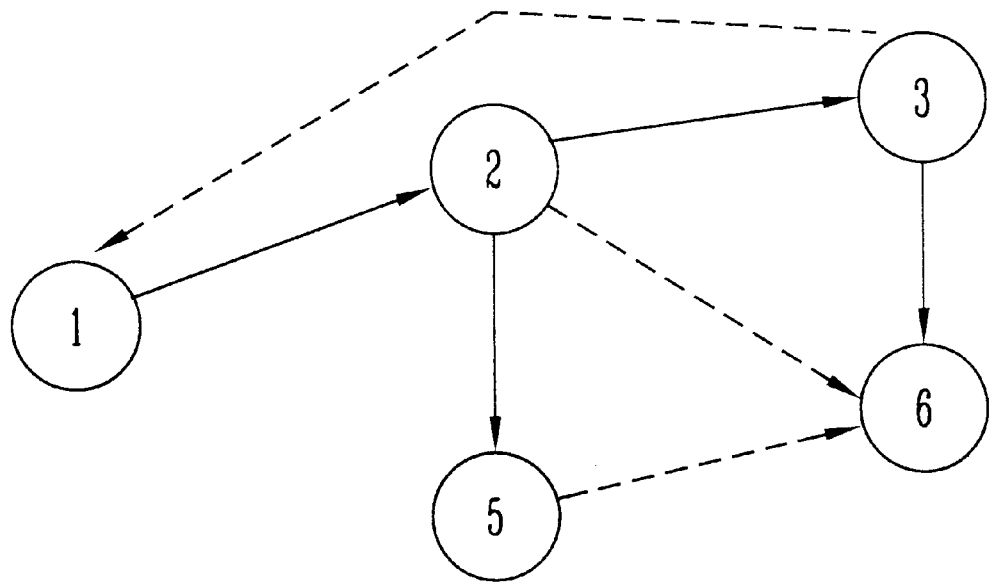
FIG. 6 is a diagram representing the spanning tree generated from the decomposition of the class-referenced graph according to the present invention.
Figure 6:
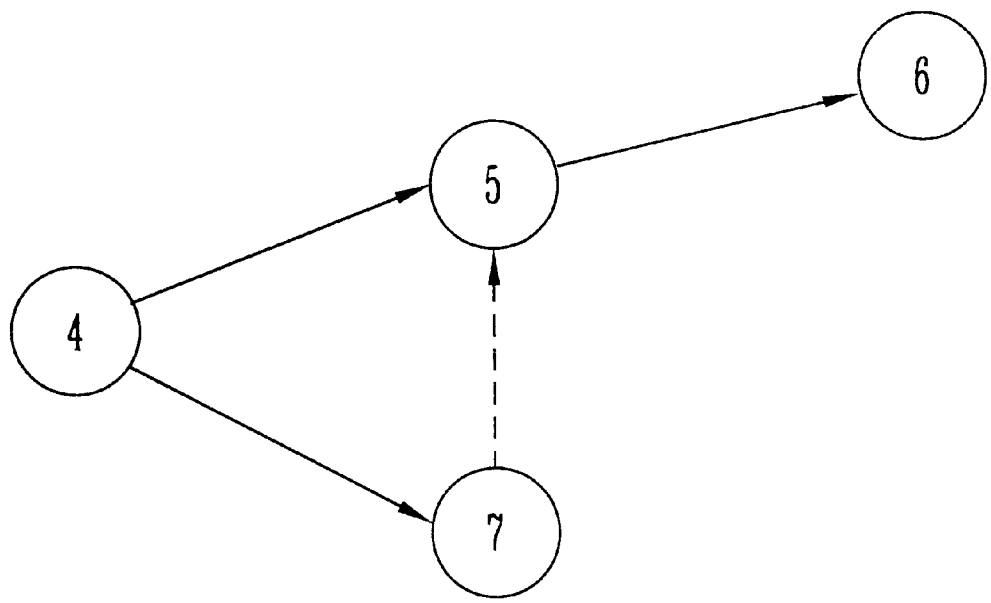

FIG. 6 is a diagram representing the spanning tree generated from the decomposition of the class-referenced graph according to the present invention. Searching this tree with postorder, the contents of the file connected to each node are entered into the database. The sequences of loading objects in the database are <6, 3, 5, 2, 1> and <6, 5, 7, 4>. If performing <6, 3, 5, 2, 1> in advance and <6, 5, 7, 4> later, the repeated 5, 6 is to be performed just once.

As described above, the present invention is effective in enhancing the system efficiency by analyzing the inter-object reference relation as a set and by generating a spanning tree, which analyzes the inter-object reference relation through a set of nodes and routes without sequentially determining the object-referenced value, and then subsequently which decides the sequence of the objects and generates a referenced value, and which decides the sequence of the related objects and generates a referenced value after cutting off a circulation in case that it exits between objects.

The foregoing description, although described in its preferred embodiment with a certain degree of particularity, is only illustrative of the principles of the present invention. It is be understood that the present invention is not to be limited to preferred embodiments disclosed and illustrated herein. Accordingly, all expedient variations that may be made within the scope and spirit of the present invention are to be encompassed as further embodiments of the present invention.

What is claimed is:

1. A method of loading objects using a spanning tree, comprising the steps of:

collecting class information related to an object loading in a script file for loading an object;

composing a class-referenced relation in a graph using the class information;

analyzing a set of classes resulting from an inter-class reference in the graph and decomposing the set of classes into the most accessible element;

searching the graph of the most accessible element and generating a spanning tree having a tree edge, a backward edge, a forward edge and a cross edge;

storing the object connected to each node while searching the spanning tree;

filling with inputs object fields other than a referenced field in case of an existence of the backward edge in a node, and temporarily allocating a null value to an excluded field, and withdrawing loading objects if a schema of the loaded object does not allow the null value in the referenced field;

entering the object and storing the entered object in a reference list since there is no inter-class reference relation in an input file, if there is a leaf node without backward edge in the node; and entering a referenced value not yet determined by searching each node of the graph in which backward edge is found.

2. The method of loading objects as claimed in claim 1, further using a deep priority searching method to search for the most accessible graph excluded.

3. The method of loading objects as claimed in claim 1, further using a postorder searching method to search for the spanning tree.

4. A method of loading objects using a spanning tree, comprising:
- collecting class information related to an object loading in a script file;
- constructing a class reference relation in a graph using the class information;
- analyzing a class set in accordance with inter-class reference from the graph, and decomposing the class set into a Maximal Reachable Component (MRC);
- generating a spanning tree having a tree edge, a backward edge, a forward edge and a cross edge using the decomposed MRC;
- searching the spanning tree and storing the object connected to each node while searching the spanning tree;
- filling with inputs object fields other than a reference field in case of an existence of the backward edge in a node, and temporarily allocating a null value to the reference field, and withdrawing loading an object if a schema of a loaded object does not allow the null value in the reference field;
- entering the object and storing the entered object in a reference list since there is no inter-class reference relation in an input file, if there is a leaf node without backward edge in the node; and
- entering a reference value not yet determined by searching each node of the graph in which backward edge is found.

5. The method of loading objects as claimed in claim 4, wherein said spanning tree is generated using a deep priority searching method based from the decomposed MRC.

6. The method of loading objects as claimed in claim 4, wherein said spanning tree is searched using a postorder searching method in order to store the object connected to each node.

7. A system, comprising:
- one or more processors;
- a storage device containing analysis modules of inter-object reference relation, a spanning tree generation module resulting from the analysis modules of inter-object reference relation, an object-referenced value generation module using a spanning tree; and
- an input/output manipulator connected to said one or more processors and said storage device, and provided to load objects from a database using the spanning tree, wherein said input/output manipulator interacts with said analysis modules of inter-object reference relation, said spanning tree generation and said object-referenced value generation module to perform the following steps:
  - collecting class information related to an object loading in a script file;
  - constructing a class reference relation in a graph using the class information;
  - analyzing a class set in accordance with inter-class reference from the graph, and decomposing the class set into a Maximal Reachable Component (MRC);
  - generating a spanning tree having a tree edge, a backward edge, a forward edge and a cross edge using the decomposed MRC;
  - searching the spanning tree and storing the object connected to each node while searching the spanning tree;
  - filling with inputs object fields other than a reference field in case of an existence of the backward edge in a node, and temporarily allocating a null value to the reference field, and withdrawing loading an object if a schema of a loaded object does not allow the null value in the reference field;
  - entering the object and storing the entered object in a reference list since there is no inter-class reference relation in an input file, if there is a leaf node without backward edge in the node; and
  - entering a reference value not yet determined by searching each node of the graph in which backward edge is found.

8. The system as claimed in claim 7, wherein said spanning tree is generated using a deep priority searching method based from the decomposed MRC.

9. The system as claimed in claim 7, wherein said spanning tree is searched using a postorder searching method in order to store the object connected to each node.

10. The system as claimed in claim 7, wherein said storage device corresponds to a disk.

* * * * *